United States Patent Office 3,206,335
Patented Sept. 14, 1965

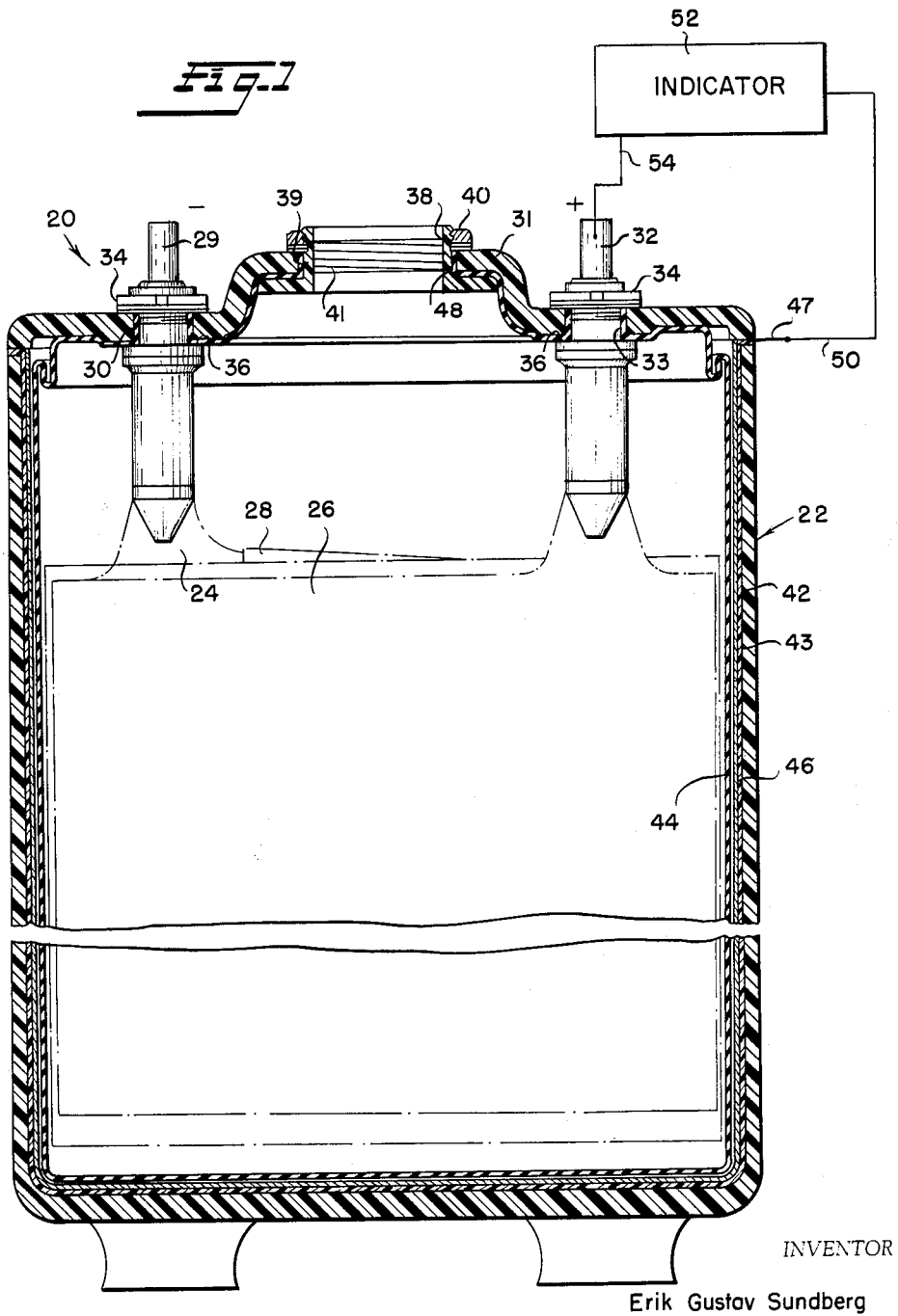

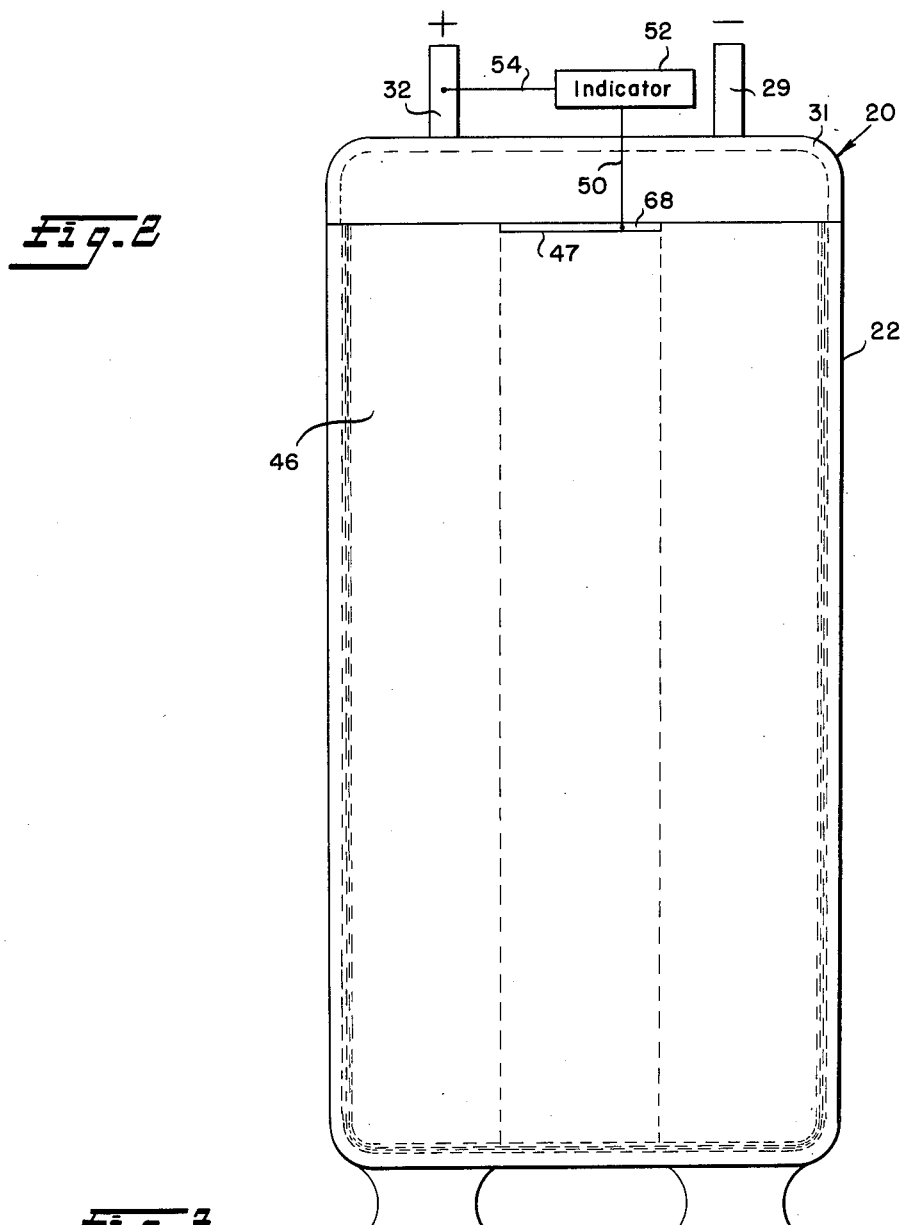
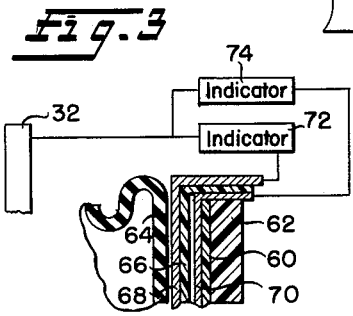

3,206,335
STORAGE BATTERIES
Erik Gustav Sundberg, Nol, Sweden, assignor to Aktiebolaget Tudor, Stockholm, Sweden, a corporation of Sweden
Filed July 12, 1962, Ser. No. 209,471
3 Claims. (Cl. 136—167)

This invention relates to electric storage batteries with liquid electrolytes and, more specifically, to improved casings for such batteries.

Battery casings are commonly made from plastic materials and from hard rubber. Casings for smaller batteries, for example starter batteries for internal combustion engines, have heretofore been made of thermoplastic materials. For battery casings of larger size, hardened plastics have been more widely used because of their superior strength and permanence of shape. One hardened plastic commonly employed is a polyester plastic material reinforced with glass wool or woven glass fibers. Another more recently developed hardened plastic which has found extensive use is reinforced Furan which has outstanding strength.

If batteries, during use, are exposed to blows or shock forces, single-walled casings, the type most commonly employed, may sustain injuries of such severity that the casing wall will be cracked, permitting electrolyte to leak from the battery. In the widely used lead-acid batteries, the electrolyte is diluted sulfuric acid, a highly corrosive substance and one which, at relatively low temperatures, may result in the formation of large quantities of highly toxic fumes.

Thus, leaking lead-acid batteries pose a serious health hazard, especially when they are located in confined spaces where the fumes and leaking electrolyte cannot readily be removed. This problem is particularly acute in submarines having, in the past, posed such a hazard as to force abandonment of the vessel.

To reduce the likelihood of electrolyte leaking through the battery casing, inner casings of soft, flexible, tough material such as soft rubber have been employed between the outer shell of the casing and the internal battery components. However, it has been found that this arrangement occasionally leads to damage of the soft inner casing, permitting electrolyte to flow into the space between the inner container and the outer shell. This problem arises because in the design of a high performance, efficient battery the interior battery space is most effectively utilized by making the clearances or unused space between the battery components and the casing very small.

Notwithstanding the fact that the outer shell may not be damaged, electrolyte may escape through a punctured or ruptured soft rubber electrolyte container and adversely affect the structural strength and insulating properties of the outer casing. In the case of glass fiber reinforced plastics, the electrolyte tends to follow the glass fibers through the casing wall, reducing the electrical resistance of the wall. In addition, fibers of the size commonly employed for this purpose are susceptible to decomposition by corrosive electrolytes such as dilute sulfuric acid. Moreover, the decomposition products of the glass are chemically active and will attack the plastic material. As the exterior container walls for the battery are opaque, a ruptured or leaking inner electrolyte container may go unnoticed until serious damage to the exterior container walls has already occurred as a result of the chemical attack by the electrolyte.

One method heretofore proposed for avoiding the difficulties discussed above was to cover the outer surfaces of the glass-fiber reinforced outer shell of the battery casing with an exterior layer of unreinforced plastic of the same type as the casing to trap electrolyte escaping through the outer shell. However, this solution proved unsatisfactory since the unreinforced outer layer generally did not have sufficient strength to resist shock forces. And, when the outer layer was cracked or otherwise damaged, it no longer functioned in the desired manner.

It is a primary object of the present invention to provide improved casings for storage batteries with liquid electrolytes which have electrolyte leakage detection means to indicate a damaged interior electrolyte container so that preventative action can be taken to substantially reduce the possibility of electrolyte leaking from the battery.

It is a further object of the present invention to provide novel multi-walled battery casing having a conducting layer in the casing wall and adapted for connection to a voltage sensitive circuit for actuating an indicator or alarm and thereby automatically providing an indication that one or more of the interior casing layers has been damaged. The conductive material is preferably the same material as the negative electrode so that the voltage sensitive circuit may be connected between said conductive material and the positive pole of the battery.

It is another object of the present invention to provide improved storage battery container including an outer casing of reinforced plastic material and an independent inner coating of substantially the same material as the outer casing but without the reinforcing fibers, to prevent chemical attack to the reinforcing fibers by the storage battery electrolyte, together with the electrolyte leakage detection metal layer to indicate electrolye leakage before damage to the outer casing will permit electrolyte leakage.

A still further object resides in providing a plural inner layer of plastic material, without reinforcing fibers, on the inside surface of the battery outer wall casing with electrolyte leakage detector layers between adjacent ones of these layers and also between the electrolyte container and the innermost layer of plastic to thereby indicate rupture or fracture of the electrolyte container and the extent that the inner ones of the plural layers are also ruptured.

Other objects and further novel features of the present invention will become readily apparent from the appended claims and from the ensuing detailed description and discussion and from the accompanying drawings in which—

FIGURE 1 is a vertical section through a storage battery having a casing constructed in accordance with the principles of the present invention;

FIGURE 2 is an end elevation showing the conductive layer serving to detect electrolyte leakage; and FIGURE 3 is a partial sectional view of a modified outer wall construction having a plurality of layers of plastic material without the reinforcing fibers and alternative layers of a conductive material connected to separate indicators to indicate the number of inner layers that may be damaged in such way as to permit electrolyte leakage.

Referring now to FIGURES 1 and 2 of the drawings in which exemplary structure is shown, the storage battery 20 of the present invention includes a battery casing 22 of novel construction in which are assembled the usual negative plates 24 and positive plates 26 spaced by separators 28. The negative plates 24 are connected in the conventional manner to a negative pole 29 which extends upwards through an aperture 30 in the cover portion 31 of battery casing 22. The positive plates 26 are similarly connected to a positive pole 32 of substantially the same construction as the negative pole which extends through an aperture 33 in battery casing cover portion 31. Poles 29 and 32 are secured to the battery casing cover portion 31 as by nuts 34 which, when tightened, force annular shoulders 36 on the poles against cover portion 31 to form a rigid connection. Prior to use, the battery is filled with an electrolyte such as dilute sulfuric acid through an aperture 38 in a member 39 secured to battery casing cover portion 31 by a nut 40. The aperture is then closed with a suitable cap (not shown) having external threads which engage the internal threads 41 in the aperture.

The above described arrangement of battery components is exemplary only and is not to be construed as limiting the scope of the present invention which is applicable to a wide variety of single and multicell batteries employing liquid electrolytes.

The novel battery casing 22 of the present invention includes an outer shell 42, an inner, liquid-tight container 44, and an intermediate electrically conductive layer 46 between the inner coating and the inner container together with the cover portion 31 described above. The material from which outer shell 42 is constructed will depend upon the size of the battery and the use to which it is to be put. Among the materials conventionally employed are thermoplastics, hardened plastics, such as polyesters strengthened with glass wool or woven glass fibers such as reinforced Furan and hard rubber.

Inner container 44 is preferably fabricated from a soft and flexible, but tough material such as soft rubber as is conventional. Inner container 44 lies adjacent inner coating 43 and adjacent the lower side of battery casing cover portion 31. The container, which may in effect be regarded as a sack, extends upwardly through apertures 30 and 33 in surrounding relationship to positive and negative poles 32 and 29 and upwardly through an aperture 48 in battery cover 31 around the member 39 in which battery filling aperture 38 is formed. Thus, inner container 44 completely surrounds the internal battery components including negative plates 24, positive plates 26, and separators 28, and prevents the electrolyte from escaping from the battery through outer shell casing 42 or battery casing cover portion 31, should either of these components be ruptured, cracked, or otherwise damaged.

It is possible, especially by shock forces of significant magnitude, to rupture the relatively soft inner container 44. This is especially true if the space enclosed by container 44 is most effectively utilized by the internal battery components since clearances between the plates and the separators on one hand and the inner container on the other will be at a minimum for purposes of optimum battery design considerations. A rupture in the inner container will permit the electrolyte to escape into the space adjacent outer shell 42. As was discussed above, corrosive electrolytes such as dilute sulfuric acid chemically attack many of the materials from which outer casings or shells are commonly made, and this will have a deleterious effect on the structural soundness and insulating properties of the battery casing. If the presence of electrolyte in this space remains undetected, the chemical attack may in time penetrate the outer shell, releasing the corrosive electrolyte and/or noxious fumes into the surrounding atmosphere and creating conditions inimical to the presence of human beings. The seriousness of this situation increases when the battery, as is common, is located in an enclosure, and is particularly acute in submarines which when submerged are commonly powered by batteries. In the latter circumstance, the conditions may become so hazardous as force the abandonment of the vessel.

As the materials from which storage battery casings are fabricated are generally opaque and as the internal battery components prevent the major portion of inner container 44 from being viewed through filler aperture 38, it is virtually impossible to determine by visual inspection that the inner container 44 has been damaged. Accordingly, the present invention provides a novel system for detecting electrolyte leaking through inner container 44 and automatically operating suitable alarms that indicate when the hazardous condition is arising.

The detector or sensing element of this system may be a conductive layer 46 disposed between inner container 44 and inner surface of casing wall 42 which, in the preferred embodiment, is a strip of metallic foil. In conventional lead-acid storage batteries foil strip 46, is preferably made from the material used as one of the electrodes, such as lead so as to react with the electrolyte to generate a potential between it and the pole for the other electrode. Other suitable materials may be employed in other types of wet cell batteries, as leakage may be detected electrically by mere contact between the electrolyte and a conductive material. Also, a wire or grid may be utilized in place of foil strip 46, if desired.

Strip 46 extends to the exterior of the battery casing to provide a terminal 47 as at a location between outer shell 42 and cover portion 31, and is connected by a lead 50 to a voltage sensing or indicator device 52 which may contain or otherwise be electrically connected to an alarm indicator.

A lead 54 is connected from indicator device 52 to the positive pole 32 of the battery where the foil strip conductive member 46 is made of the same material as negative plates 24.

Upon being contacted by electrolyte, conductive strip 46 will react in the same manner as the negative plates 24, resulting in a voltage being generated between it and positive pole 32. The voltage produced causes current to flow in the external circuit which in turn causes operation of indicator 52 which may be a light, horn or other device. Indicator 52 in its most elementary form could be a lamp energized by the battery potential available between terminal 47 and pole 32. Alternatively, as the current flowing in the indicator circuit 52 may be quite small, an external voltage sensitive means such as a bridge circuit coupled to a transistorized amplifier may be preferred for some installations. The amplifier output may be employed to operate remotely located alarms or controls for automatically isolating a battery compartment or otherwise preventing a hazardous situation from arising.

An inner coating 43 at the inside surface of outer shell 42 may, if desired, be provided. Such inner coating 43 immediately adjacent outer shell 42 is preferably formed as an independent sack or container clamped in place between the upper edge of outer shell 42 and cover portion 31, but otherwise free to move relative to the outer shell. The freedom of movement between outer shell 42 and inner coating 43 prevents externally applied sharp blows from damaging coating 43. Consequently, electrolyte may often be prevented from leaking from the battery even if the blow ruptures the outer shell 42 and the primary electrolyte container 44. Coating 43 is preferably formed from material which has substantially the same plastic composition as outer shell 42 but which has no glass or other reinforcing fibers. In addition, coating 43 is preferably formed from calendered sheets since the rolling and stretching of the plastic in the calendering operation produces a molecular orientation which substantially increases the strength of the plastic.

The inner coating 43 significantly increases the strength of the battery casing. In addition, should electrolyte escape from the interior of the battery through a rupture or other discontinuity in the inner container 42, the coating 43 will prevent the electrolyte from contacting outer shell 42 with its attendant destructive action along the reinforcing fibers as pointed out above.

It may be desirable, in particular applications, to form the equivalent of layer 43 from a number of independent layers, providing a stratified structure as diagrammatically indicated in FIGURE 3. In this circumstance, the outermost layer 60 of the coating may advantageously be bonded to the outer casing 62 of the battery container. Between bonded layer 60 and the inner electrolyte container 64 is another sack-like container or layer 66 which may be identical to layer 43 of the embodiment of FIGURES 1 and 2.

Electrically independent strips or conductive layers 68 and 70 may be inserted between layers of insulating material with layer 68 corresponding to layer 46 of FIGURE 1 and with an electrically separate layer 70 located between bonded layer 60 and inner sack layer 66. Each of the conductive material layers 68 and 70 may be connected to independent indicators 72 and 74 respectively and to the positive battery pole 32 in the manner described above. In this embodiment, one or both of the indicators will be operated depending upon whether container 64 only or both it and layer 66 have ruptured to permit electrolyte leakage. In this manner personnel monitoring the condition of the battery are advised not only that one or more of the interior layers in the battery is leaking electrolyte, but, also through how many layers the leak extends.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a storage battery of the type having positive and negative plate-like electrodes spaced by separators and containing a liquid electrolyte; and an improved container for said battery comprising: an outer casing of shock and electrolyte resistant insulating material; a liquid-tight electrolyte container formed as a sack and from a comparatively soft, flexible and pliable material on the inside of said outer casing; electrically conductive material located between said outer casing and said liquid-tight container and having a terminal portion extending outside said outer casing, said electrically conductive material being formed of the same material as one of said platelike electrodes; and means responsive to an electrical potential on said terminal portion resulting from said electrolyte contacting said conductive material for indicating rupture of said liquid-tight container connected between the terminal on said conductive material and a pole on the battery for the other electrode.

2. In a storage battery of the type having positive and negative plate-like electrodes spaced by separators and containing a liquid electrolyte; and an improved container for said battery comprising: a main liquid-tight electrolyte container formed as a sack and from a comparatively soft, flexible and pliable material for containing the electrolyte; an outer casing of shock and electrolyte resistant insulating material having reinforcing fibers surrounding said container; and a plurality of layers located between the inside surface of said outer casing and said electrolyte container, the first of said layers being a protective covering applied to the inner wall surface of said outer case composed of a layer of the same plastic material but without said reinforcing fibers, the second layer being a conductive material having a terminal portion extending outside the battery casing, the third layer being an electrolyte resistant plastic insulating material formed as a sack, and the fourth layer being electrically conductive material having a second terminal portion extending outside the battery casing; and means for independently indicating rupture of said layers formed as sacks comprising a separate indicator connected between the terminal portion of each of said layers of conductive material and a terminal of said battery to thereby indicate the degree of penetration of the electrolyte from said main container toward the outer casing of the battery.

3. In a storage battery of the type having positive and negative plate-like electrodes spaced by separators and containing a liquid electrolyte; and an improved container for said battery comprising: an outer casing of shock and electrolyte resistant insulating material; a liquid-tight electrolyte container formed as a sack and from a comparatively soft, flexible and pliable material on the inside of said outer casing; electrically conductive material located between said outer casing and said liquid-tight container and having a terminal portion extending outside said outer casing; and indicator means connected between a pole on said battery and the terminal portion of the electrically conductive material for indicating rupture of said liquid-tight container resulting in electrolyte contacting said conductive material.

References Cited by the Examiner

UNITED STATES PATENTS

| 2,054,699 | 9/36 | Geyer. | |
|---|---|---|---|
| 2,981,886 | 4/61 | Beck | 324—54 |

FOREIGN PATENTS

| 412,840 | 7/34 | Great Britain. |
|---|---|---|
| 579,271 | 7/46 | Great Britain. |

JOHN H. MACK, *Primary Examiner.*